US012655879B2

(12) United States Patent
Boffelli et al.

(10) Patent No.: US 12,655,879 B2
(45) Date of Patent: Jun. 16, 2026

(54) BRAKE SYSTEM AND METHOD

(71) Applicant: POLI S.r.l., Camisano (IT)

(72) Inventors: Roberto Boffelli, Camisano (IT); José Manuel Saraiva Carvalho, Cologne (DE)

(73) Assignee: POLI S.r.l., Camisano (IT)

( * ) Notice: Subject to any disclaimer, the term of this patent is extended or adjusted under 35 U.S.C. 154(b) by 232 days.

(21) Appl. No.: 17/534,494

(22) Filed: Nov. 24, 2021

(65) Prior Publication Data

US 2023/0012996 A1 Jan. 19, 2023

Related U.S. Application Data

(60) Provisional application No. 63/223,507, filed on Jul. 19, 2021.

(51) Int. Cl.
　　*F16D 65/12* (2006.01)
　　*F16D 65/02* (2006.01)

(52) U.S. Cl.
　　CPC .... F16D 65/121 (2013.01); *F16D 2065/1384* (2013.01); *F16D 2065/1392* (2013.01)

(58) Field of Classification Search
　　CPC ............. F16D 2065/1392; F16D 65/12; F16D 2065/1384; F16D 65/123; F16D 2065/1316; F16D 2065/1328; F16D 65/128; F16D 2065/1312; F16D 2065/1356; F16D 2065/13; F16D 2065/134; F16D 2250/0084; F16D 65/121; F16D 65/142; F16D 65/143; F16D 65/144; F16D 65/145;

(Continued)

(56) References Cited

U.S. PATENT DOCUMENTS 2,745,518 A * 5/1956 Bachman .............. F16D 65/123
　　　　　　　　　　　　　　　　　188/218 XL
2,765,881 A * 10/1956 Pierce ................... F16D 65/128
　　　　　　　　　　　　　　　　　188/218 XL (Continued)

FOREIGN PATENT DOCUMENTS

AU　　　2020224093 A1 * 9/2021 ................ B60T 5/00
EP　　　　3939854 A1　 1/2022
IT　　　UA20163766 A1　11/2017

OTHER PUBLICATIONS

EP 758059 A1 (Year: 1997).*

(Continued)

*Primary Examiner* — Robert A. Siconolfi
*Assistant Examiner* — Mahbubur Rashid
(74) *Attorney, Agent, or Firm* — K&L Gates LLP

(57) ABSTRACT

An adapter of a brake system includes a body that extends around a portion of an axle of a vehicle system. The body may include an interior portion that is positioned between a center passage of the body and an exterior portion of the body in a radial direction away from the center passage. A hub coupling feature is positioned on the interior portion of the body and may be coupled with a portion of a wheel hub of the vehicle system. A brake disc coupling feature is positioned on the exterior portion of the body and may be coupled with a portion of a brake disc assembly. The wheel hub and the brake disc assembly are incompatible such that the wheel hub is prohibited from being directly coupled with the brake disc assembly.

18 Claims, 11 Drawing Sheets

(58) Field of Classification Search
CPC .... F16D 65/146; F16D 65/147; F16D 65/148;
B60B 27/0052; B60B 27/00; B60B 3/16;
B60B 27/02
See application file for complete search history.

(56) References Cited

U.S. PATENT DOCUMENTS

| | | | | |
|---|---|---|---|---|
| 3,076,896 | A * | 2/1963 | Smith ................. | H02M 3/3388 250/214 R |
| 3,767,221 | A * | 10/1973 | Asberg ............... | B60B 27/0005 188/18 A |
| 3,933,228 | A * | 1/1976 | Otto ...................... | F16D 65/123 188/218 XL |
| 4,132,294 | A * | 1/1979 | Poli ....................... | F16D 65/128 188/218 XL |
| 4,501,346 | A * | 2/1985 | Bogenschutz ........ | F16D 65/123 188/218 XL |
| 4,930,606 | A * | 6/1990 | Sporzynski ........... | F16D 65/128 188/218 XL |
| 5,379,869 | A * | 1/1995 | Fox ....................... | F16D 65/124 188/218 XL |
| 6,076,896 | A * | 6/2000 | Bertetti ................ | F16D 65/128 188/73.31 |
| 6,095,291 | A * | 8/2000 | Bertetti ................... | B60T 1/067 188/18 R |
| 6,230,555 | B1 * | 5/2001 | Doerrie ................ | G01L 3/1457 73/129 |
| 6,808,050 | B2 * | 10/2004 | Lehmann ................ | F16D 65/12 188/218 XL |
| 7,017,718 | B2 * | 3/2006 | Gotti ..................... | F16D 65/123 188/218 XL |
| 7,159,698 | B2 * | 1/2007 | Banks ................... | F16D 65/122 188/73.1 |
| 7,228,946 | B2 * | 6/2007 | Baumgartner ........ | F16D 65/123 188/218 XL |
| 7,380,645 | B1 * | 6/2008 | Ruiz ....................... | F16D 65/12 188/218 XL |
| 7,850,251 | B1 * | 12/2010 | Sadanowicz .............. | B60B 3/16 188/218 XL |
| 8,967,339 | B2 * | 3/2015 | Drewes ................. | F16D 65/123 188/218 XL |
| 9,791,008 | B1 * | 10/2017 | Wang .................... | F16D 65/128 |
| 10,323,704 | B2 | 6/2019 | Huang | |
| 10,619,689 | B2 * | 4/2020 | Boffelli ................ | F16D 65/128 |
| 11,767,895 | B2 * | 9/2023 | Harouni ............... | F16D 65/121 188/218 XL |
| 2002/0117361 | A1 * | 8/2002 | von Sivers .......... | F16D 65/0006 188/72.4 |
| 2014/0374201 | A1 * | 12/2014 | Wurth ................... | F16D 65/123 188/218 XL |
| 2016/0160947 | A1 | 6/2016 | Wen | |
| 2018/0339550 | A1 * | 11/2018 | Wittlinger .............. | B60B 27/02 |
| 2022/0069668 | A1 * | 3/2022 | Huard ...................... | H02K 5/16 |

OTHER PUBLICATIONS

DE 202005018329 U1 (Year: 2006).*
EP 2984363 B1 (Year: 2018).*
EP 3795853 B1 (Year: 2021).*
Extended European Search Report for corresponding EP Application No. 22185487.0-1012 dated Dec. 1, 2022 (8 pages).

* cited by examiner

BRAKE SYSTEM AND METHOD

CROSS-REFERENCE TO RELATED APPLICATIONS

This application claims priority to U.S. Provisional Application No. 63/223,507 (filed 19 Jul. 2021), the entire disclosure of which is incorporated herein by reference.

BACKGROUND

Technical Field

The subject matter described herein relates to a brake system and related method.

Discussion of Art

Mobile and stationary systems including axles may include hubs and friction rings or brake assemblies coupled with the hubs to control a speed of rotation of the axles. The systems may be vehicle systems or stationary systems such as turbines, manufacturing machinery, power generating systems, or the like. The type and style of the friction rings may be based on the type and style of the hub. For example, one type of friction ring may be compatible with a hub, but another type of friction ring may be incompatible with the same hub. Over time, the friction rings may become stressed or worn, and may require repair or replacement. The operator of the system may be required to replace the worn friction rings with only the same type of friction rings that are compatible with the existing hub. However, the operator may prefer to replace the worn friction rings with a different type of friction rings that may be incompatible with the existing hub. In order to use the new, different type of friction rings within the system, the existing hub may need to be removed from the axle, and a new type of hub that is compatible with the different type of friction rings may be installed. A need exists for enabling otherwise incompatible hubs and friction rings to be compatible with each other.

BRIEF DESCRIPTION

In one or more embodiments, an adapter includes a body having plural surfaces configured to extend around at least a portion of an axle of a vehicle system. The body may include an interior portion and an exterior portion. The interior portion is positioned between a center passage of the body and the exterior portion in a radial direction away from the center passage. A hub coupling feature is positioned on the interior portion of the body. The hub coupling feature may be coupled with a portion of a wheel hub of the vehicle system. The wheel hub is operably coupled with the axle of the vehicle system. A brake disc coupling feature is positioned on the exterior portion of the body. The brake disc coupling feature may be coupled with a portion of a brake disc assembly. The brake disc assembly is configured to control a rotational speed of the axle. The wheel hub and the brake disc assembly are incompatible such that the wheel hub is prohibited from being directly coupled with the brake disc assembly.

In one or more embodiments, a method includes coupling a portion of a wheel hub of a vehicle system with a hub coupling feature of an adapter. The adapter includes a body having plural surfaces configured to extend around at least a portion of an axle of the vehicle system. The body may include an interior portion and an exterior portion. The interior portion is positioned between a center passage of the body and the exterior portion in a radial direction away from the center passage. The hub coupling feature is positioned on the interior portion of the body. The wheel hub is operably coupled with the axle. A portion of a brake disc assembly may be coupled with a brake disc coupling feature of the adapter. The brake disc coupling feature is positioned on the exterior portion of the body. The wheel hub and the brake disc assembly are incompatible such that the wheel hub is prohibited from being directly coupled with the brake disc assembly.

In one or more embodiments, a brake system includes a wheel hub operably coupled with an axle of a vehicle system, a brake disc assembly configured to control a rotational speed of the axle, and an adapter. The adapter has a body extending around at least a portion of the axle. The body includes an interior portion and an exterior portion. The interior portion of the body is positioned between a center passage of the body and the exterior portion in a radial direction away from the center passage. The body may include a hub coupling feature positioned on the interior portion of the body. The hub coupling feature may be coupled with a portion of the wheel hub of the vehicle system. The body also includes a brake disc coupling feature positioned on the exterior portion of the body. The brake disc coupling feature may be coupled with a portion of the brake disc assembly. The wheel hub and the brake disc assembly are incompatible such that the wheel hub is prohibited from being directly coupled with the brake disc assembly.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
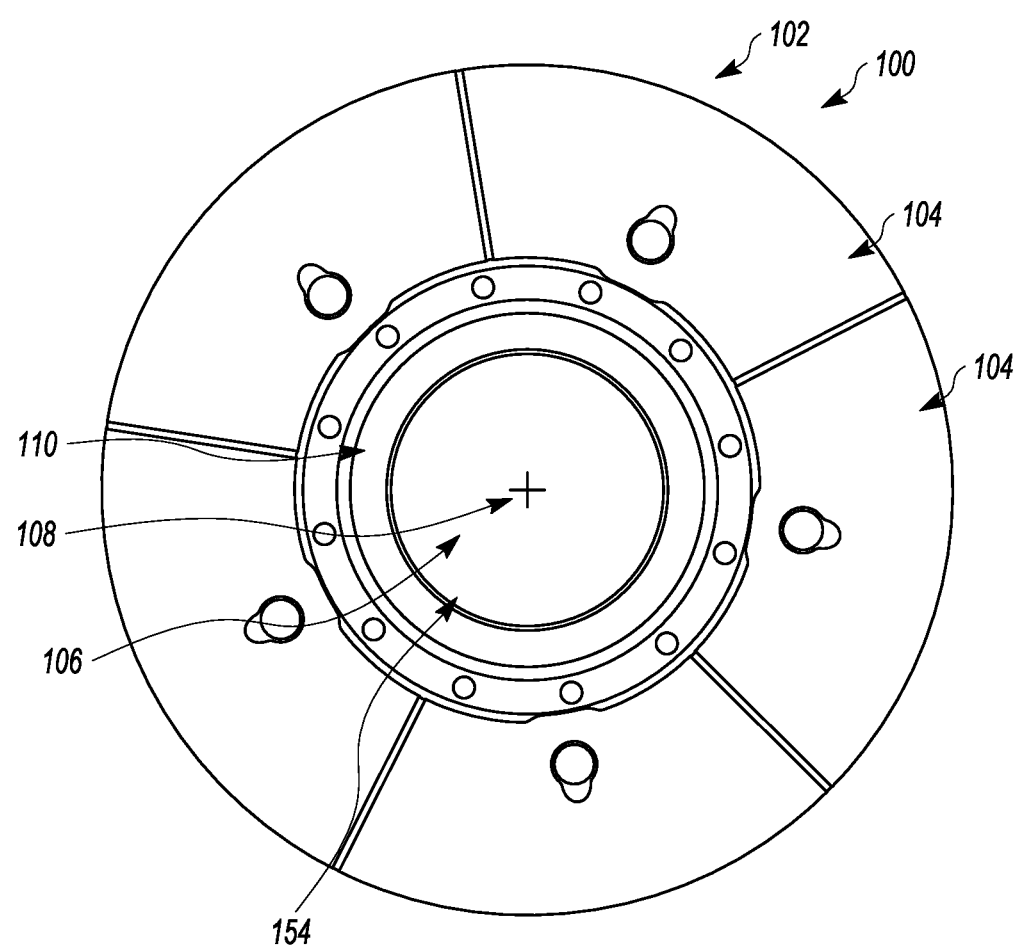
FIG. 1 illustrates a front view of a brake system in accordance with one embodiment.

Embodiments of the subject matter described herein relate to a brake system and a method of operation. The brake system may be disposed onboard or operably coupled with a moving and/or stationary system that includes at least one rotating axle. For example, the brake system may be used to control a speed of rotation of an axle of the system. The system may be a vehicle system, which may be a propulsion-generating vehicle such as, but not limited to, a locomotive or other rail vehicle, a switcher vehicle, an automobile, a truck, a bus, a mining vehicle, a marine vessel, an aircraft (manned or unmanned, such as a drone), an agricultural vehicle, or another off-highway vehicle (e.g., vehicles that are not legally permitted and/or are not designed for travel on public roadways). Optionally, the vehicle system may be a non-propulsion generating vehicle, such as a railcar, or the like. Optionally, the system may be a stationary system such as wind-powered turbine, manufacturing machinery, power generating systems, or the like.

The brake system may include a hub and a brake disc assembly that are coupled with the axle. For example, the hub may be a wheel hub (e.g., of a vehicle system), an axle hub (e.g., of a stationary system), or the like. The brake disc assembly may be used to control a speed of rotation of the axle, e.g., by selective operation of a brake caliper-driven brake pad(s) (not shown) pressed against the brake disc assembly. In one embodiment an operator of the system may manually control actuation of the brake pad(s) against the brake disc assembly. In another embodiment, a controller or control system may automatically control actuation of the brake pad(s) against the brake disc assembly to automatically control a speed of rotation of the axle.

In one or more embodiments, the hub or wheel hub may be incompatible with the brake disc assembly. For example, the hub may be prohibited from bring directly coupled with the brake disc assembly, e.g., by virtue of the hub having a different pattern or other configuration of fastener apertures (e.g., different number, different spacing, and/or different diameter) than a pattern (or other configuration) of fastener apertures of the brake disc assembly, and/or the brake disc assembly having a different inner radius of curvature that an outer radius of curvature of the hub. As a result, the brake system includes an adapter disposed between the hub and the brake disc assembly. For example, the hub is operably coupled with a portion of the adapter, and the brake disc assembly is operably coupled with another portion of the adapter to indirectly couple the brake disc assembly with the hub.

In one or more embodiments, the adapter may allow different brake discs or brake disc assemblies to be coupled with wheel hubs. For example, a vehicle system may include an existing wheel hub that is coupled with an axle of the vehicle system. The existing brake discs may need to be removed from the brake system for repair, maintenance, replacement, or the like. The adapter may allow different brake discs to be coupled with the wheel hub that may otherwise be incompatible with the wheel hub. The adapter may allow different brake disc assemblies to be coupled with wheel hubs that would be unable to or prohibited from being directly coupled together without the adapter.

Figure 2:
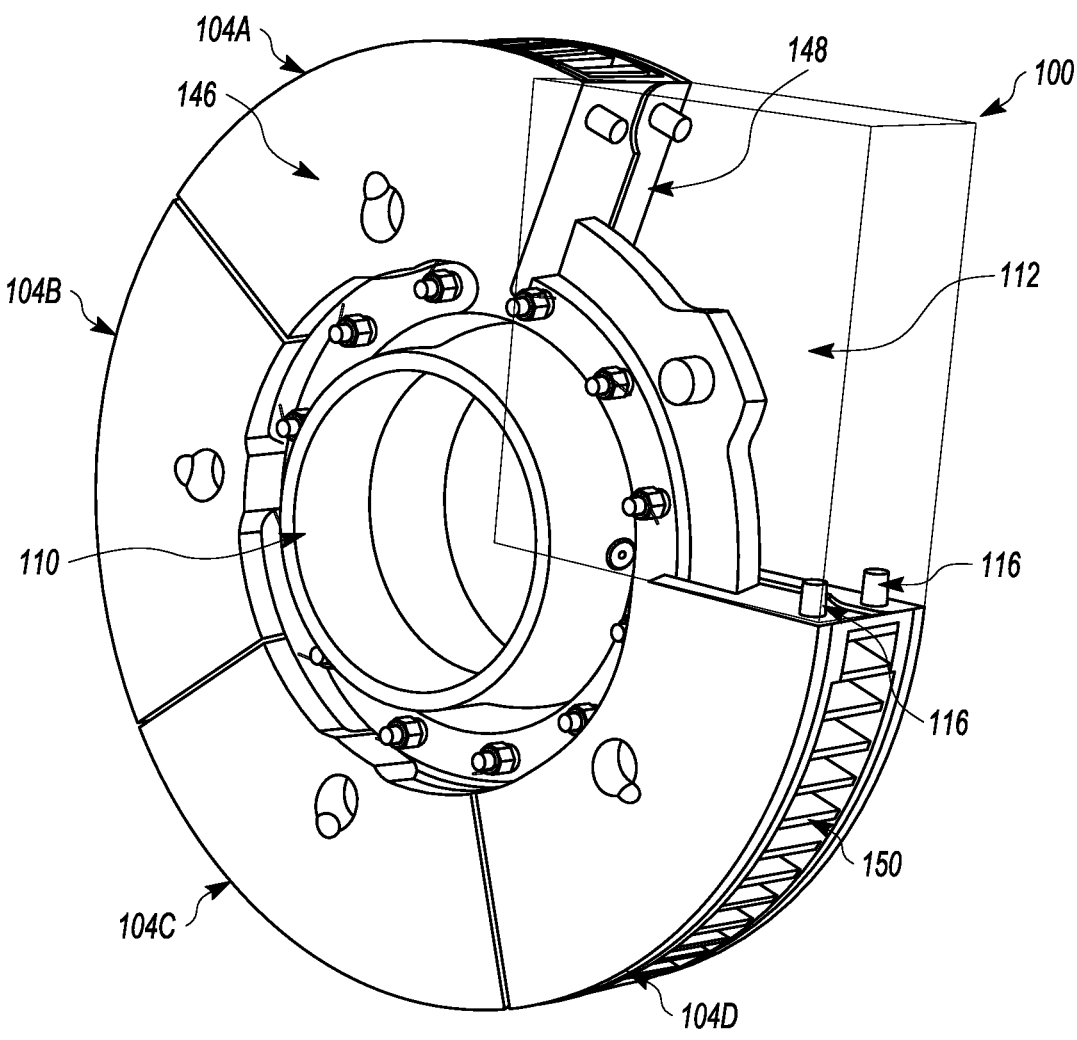
FIG. 2 illustrates a perspective partial view of the brake system shown in FIG. 1.

FIG. 1 illustrates a brake system 100 in accordance with one or more embodiments. FIG. 2 illustrates a perspective partial view of the brake system. The brake system includes a wheel hub 110 that includes a passage 106 defined by an interior surface 154 of the wheel hub. The passage receives an axle (not shown) of the system (e.g., a vehicle system, a stationary system, or the like) that extends along a center axis 108 of the wheel hub.

The brake system includes a brake disc assembly 102 that controls a speed of rotation of the axle. The brake disc assembly may also be referred to as a friction ring, segmented friction ring, or the like. In the illustrated embodiment of FIGS. 1 and 2, the brake disc assembly is a segmented brake disc assembly that includes plural segments 104 disposed around a perimeter of the wheel hub. In the illustrated embodiment of FIG. 2, a segment of the first brake disc assembly is hidden and a segment of the second brake disc assembly is hidden.

One or more of the segments 104 may include one or more segment coupling features 116. In the illustrated embodiment, the segment coupling features are pegs or posts that extend away from a surface of at least one of the segments. A neighboring segment about the perimeter of the axle may include a corresponding coupling feature, such as a receiving pocket or recess. For example, the segment 104A may be coupled with the neighboring segment 104B via one or more segment coupling features (not shown). Optionally, neighboring segments may be coupled with each other by alternative coupling methods such as, but not limited to, male/female features, fasteners, or the like. In the illustrated embodiment, the brake disc assembly include five segments, respectively. Additionally, each of the five segments are uniformly shaped, sized, and oriented relative to each other segment. Optionally, the segmented brake disc assembly may include any number of segments having the same or different shapes and/or sizes, may be disposed at the same or different positions about the perimeter of the axis, or any combination therein.

The brake disc assembly may include one or more fins 150 or other fluid control features that are disposed between the first brake disc assembly and the second brake disc assembly. In the illustrated embodiment of FIG. 2, the fins extend between an interior side of the segments of the first brake disc assembly and an interior side of the segments of the second brake disc assembly. The fins may control a thermal energy of the brake system, and/or control flow characteristics of a fluid that may move within and/or around the brake system. For example, the fins may direct a cooling fluid (e.g., atmospheric air or an alternative cooling fluid) in one or more directions between the brake disc assemblies. The fins may be shaped, sized, and/or oriented to control a pressure, direction of movement, speed, turbulence, or the like, of the cooling fluid moving within the brake system. Optionally, the brake system may include alternative thermal energy control features, structures, or the like.

In one or more embodiments, the brake disc assembly may be incompatible with the wheel hub. For example, the brake disc assembly, or the segments of a segmented brake disc assembly, may be prohibited from being properly directly coupled with the wheel hub. The wheel hub and the segmented brake disc assembly may have different number of fastener apertures, different spacing of fastener apertures, different fastener apertures, different radii of curvature, or any combination therein. For example, the wheel hub and the segmented brake disc assembly may have mismatching fastener aperture configurations. The brake system includes an adapter 112 that indirectly couples the wheel hub with the brake disc assembly. For example, one portion of the adapter may include a fastener aperture profile or pattern for connection to the wheel hub (via a first fastener), and another portion of the adapter may have another fastener aperture profile or pattern for connection to the segmented brake disc assembly (via a second fastener).

Figure 3:
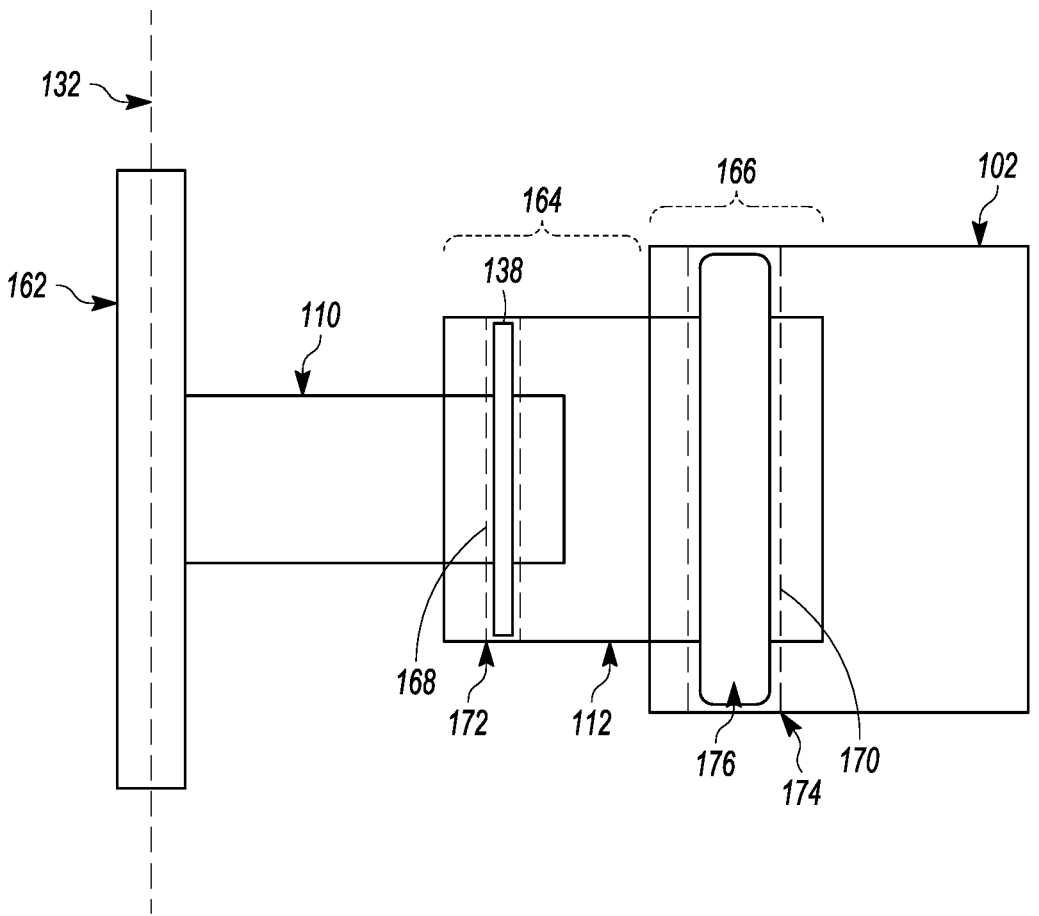
FIG. 3 illustrates a schematic of a cross-sectional view of the brake system shown in FIG. 1.

FIG. 3 illustrates one example of a schematic of a partial cross-sectional view of the brake system in accordance with one embodiment. The wheel hub 110 is operably coupled with an axle 162 that extends along a center axis 132. The adapter 112 includes an interior portion 164 and an exterior portion 166. The interior portion is disposed or positioned between the axle and the exterior portion of the adapter. The interior portion of the adapter is coupled with the wheel hub, and the exterior portion of the adapter is coupled with the brake disc assembly 102. For example, the adapter includes a first passage 172 disposed within the interior portion that extends a width of the adapter, and the wheel hub includes a second passage 168 that extends a width of the wheel hub. A first fastener 138 may extend through the first and second passages of the adapter and the wheel hub, respectively, to couple the adapter with the wheel hub. Additionally, the adapter includes a third passage 170 disposed within the exterior portion that extends the width of the adapter, and the brake disc assembly includes a fourth passage 174 that extends a width of the brake disc assembly. A second fastener 176 may extend through the third and fourth passages of the adapter and the brake disc assembly, respectively, to couple the adapter with the brake disc assembly.

In the illustrated embodiment shown in FIG. 3, the fourth passage of the brake disc assembly is incompatible with the second passage of the wheel hub. For example, a size of the fourth passage is larger that a size of the second passage. Optionally, the second and fourth passages may be incompatible for other reasons, such as the passages extend in different directions, the passages may be unable to be properly aligned based on the sizes of the wheel hub and/or the brake disc assembly, the wheel hub and/or the brake disc assembly may have different numbers of fastener apertures, may have different spacing of fastener apertures, the different fastener apertures may be configured to receive different shapes and/or sizes of fasteners, or the like. Optionally, the brake disc assembly may have a different inner radius of curvature than an outer radius of curvature of the wheel hub. Optionally, the wheel hub and the brake disc assembly may be incompatible with each other for any alternative reason. The adapter may be used to indirectly couple the wheel hub with the brake disc assembly.

Figure 4:
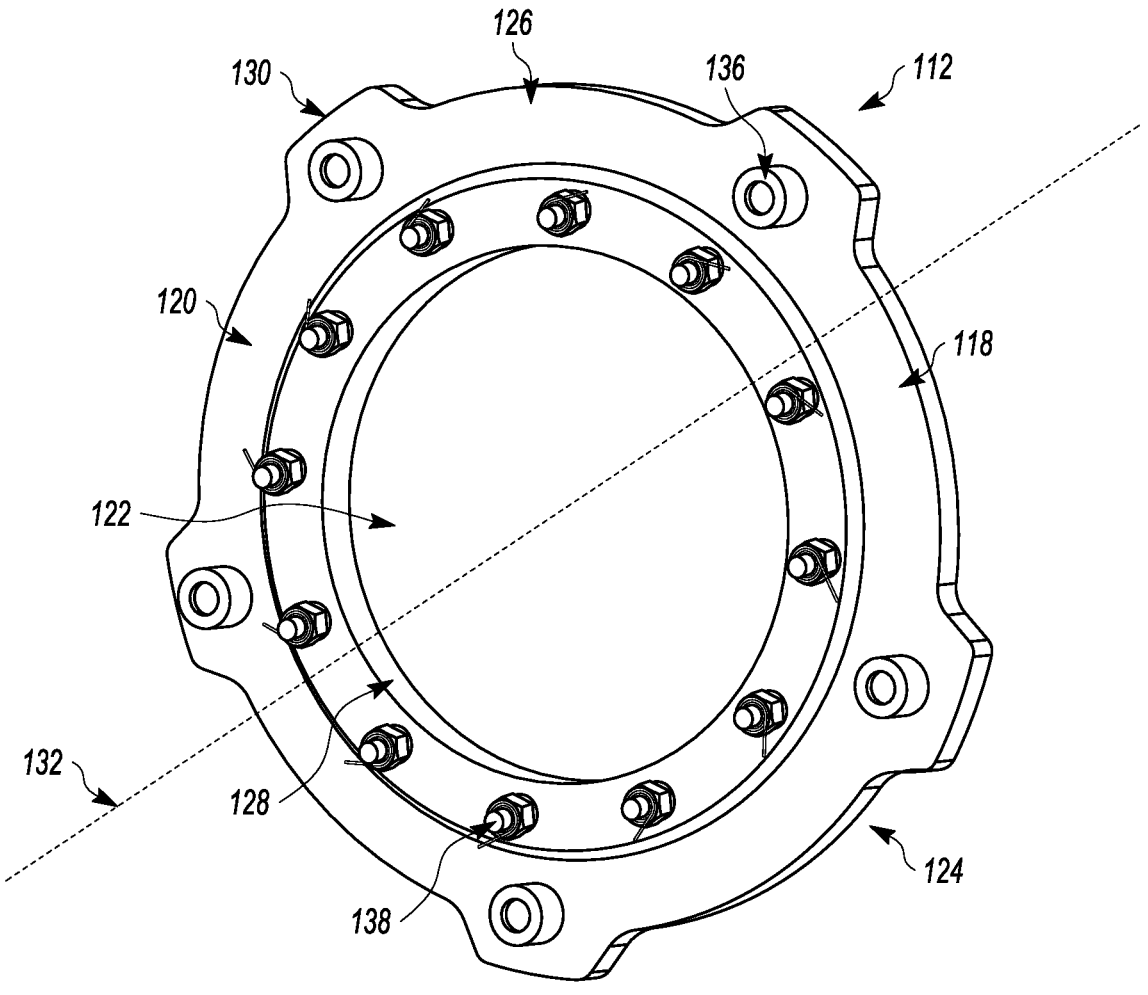
FIG. 4 illustrates a perspective view of an adapter of a brake system in accordance with one embodiment.

FIG. 4 illustrates a perspective view of the adapter of the brake system in accordance with one embodiment. The adapter 112 includes a body 118 having plural surfaces that extend around at least a portion of the axle (not shown). In the illustrated embodiment of FIG. 4, the body of the adapter extends around a center axis 132. The adapter includes an interior surface 128 that faces toward the wheel hub and defines a passage 122 of the adapter that is concentric with the center axis of the wheel hub and the axle. The adapter also includes an exterior surface 126 that faces away from the wheel hub, a first side 120, and an opposite second side 124 along the center axis.

In the illustrated embodiment of FIG. 4, the body of the adapter has a circular shape and extends about the center axis. Alternative, the body may extend about only a portion of the center axis. For example, the adapter may have a semi-circular shape, may be crescent shaped, or the like. Optionally, the adapter may be composed of or include plural segments of the adapter that are separated from each other and disposed about the center axis.

In one or more embodiments, the adapter may be machined or otherwise manufactured of a metal or metallic alloy such as, but not limited to, steel, chromium, titanium, or the like. For example, the adapter may be designed and manufactured in order to withstand rotational and other forces generated by the rotation of the axle. In one embodiment, the adapter may be coupled with a wheel hub of an axle of a mobile and/or stationary system such as a vehicle system (rail vehicle, locomotive, mining vehicle, agricultural vehicle, or the like), a wind-powered turbine, manufacturing machinery, power generating systems, or the like. In one embodiment, the adapter may have a diameter that is less than 100 millimeters (mm), about 300 mm, about 500 mm, or the like. Additionally, the adapter may have a width (e.g., between the first side and the second side of the adapter along the center axis) that is about 25 mm, about 50 mm, about 100 mm, or the like. In one or more embodiments, the adapter may be designed and manufactured (e.g., shaped, sized, made of a particular material, or the like) to be coupled with a brake system that has an overall diameter that may be about 400 mm, 600 mm, 1 meter, or the like, and a wheel hub that has an overall diameter that may be about 50 mm, 100 mm, 250 mm, 300 mm, or the like.

The segments of the segmented brake disc assembly shown in FIG. 2 extend along the center axis of wheel hub between a first side 146 and an opposite second side 148. For example, each segment includes a portion that is disposed on the first side of the adapter and a portion that is disposed on the second side of the adapter. Optionally, in one or more embodiments, the brake disc assembly may include plural segments that are coupled with each other on separate sides of the adapter. For example, first segments may be disposed on the first side of the adapter and may be coupled together to form a first brake disc assembly. Additionally, second segments may be disposed on a second side of the adapter and may be coupled together to form a second brake disc assembly. For example, the first brake disc assembly may be mirrored with the second brake disc assembly about the adapter.

The adapter includes plural exterior protrusions 130 disposed about the perimeter of adapter that extend away from the exterior surface and away from the passage of the adapter. In the illustrated embodiment, the adapter includes five protrusions, but may alternatively include any number of commonly shaped or uniquely shaped protrusions. In one or more embodiments, the adapter may include a number of protrusions that is the same as a number of segments of the each of the segmented brake disc assemblies. Each of the protrusions extend a common distance away from the exterior surface, and are spaced apart from neighboring segments at substantially common distances away from each other. Optionally, one or more may extend a different distance away from the exterior surface relative to the other protrusions, one or more may be disposed closer to or further apart from neighboring protrusions, one or more may be disposed at different radial positions relative to the center axis, or any combination therein.

The adapter includes plural coupling features that may be used to couple the adapter with the wheel hub and the adapter with the segments of the brake disc assembly to indirectly couple the wheel hub with the brake disc assembly. The adapter may include one or more hub coupling features that may be shaped, sized, and/or oriented to correspond with features of the wheel hub in order to couple the adapter with the wheel hub. Additionally, the adapter may include one or more brake disc coupling features that may be shaped, sized, and/or oriented to correspond with features of the brake disc assembly in order to couple the adapter with the brake disc assembly.

Figure 5:
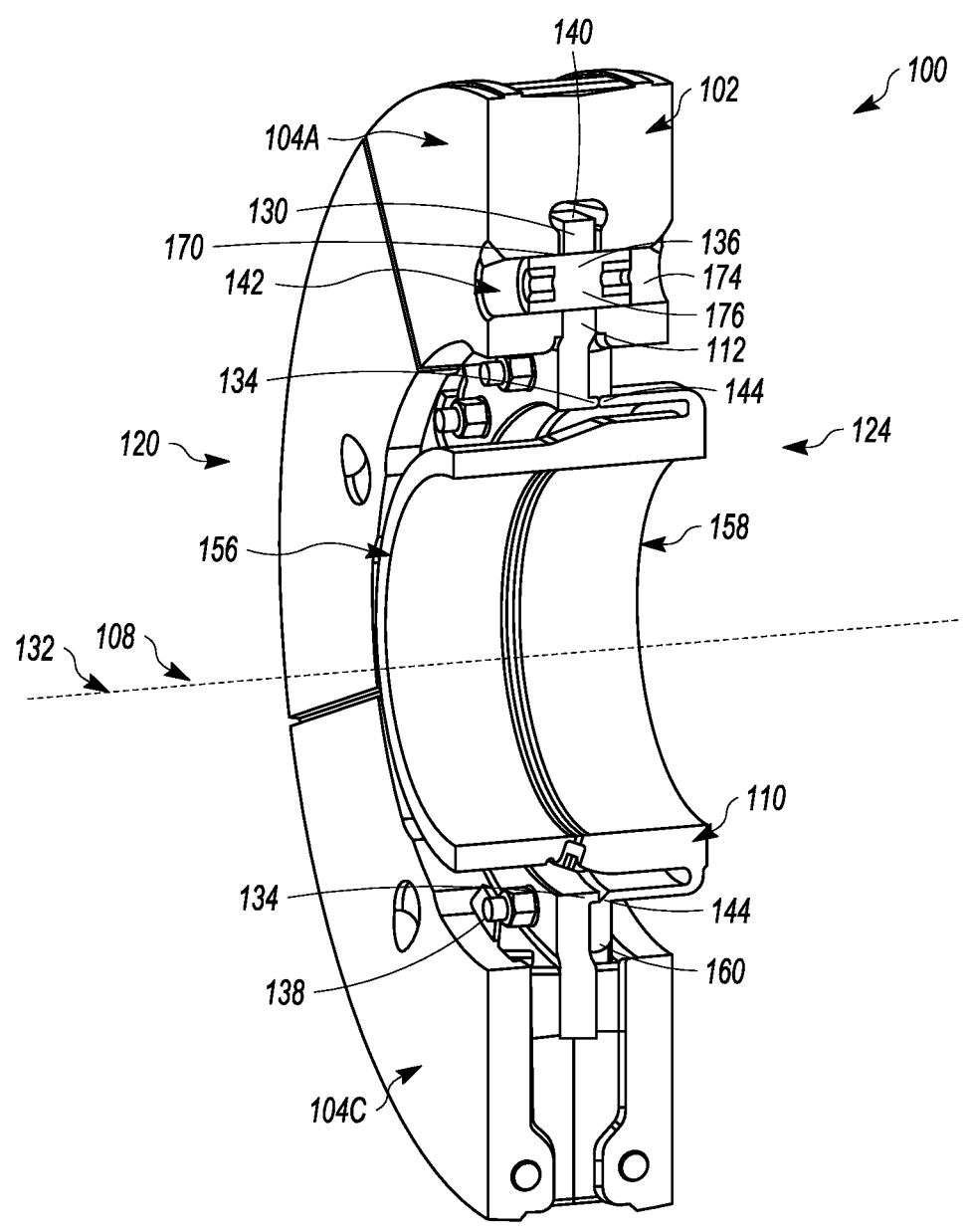
FIG. 5 illustrates a perspective cross-sectional view of the brake system shown in FIG. 1 in accordance with one embodiment.
Figure 6:
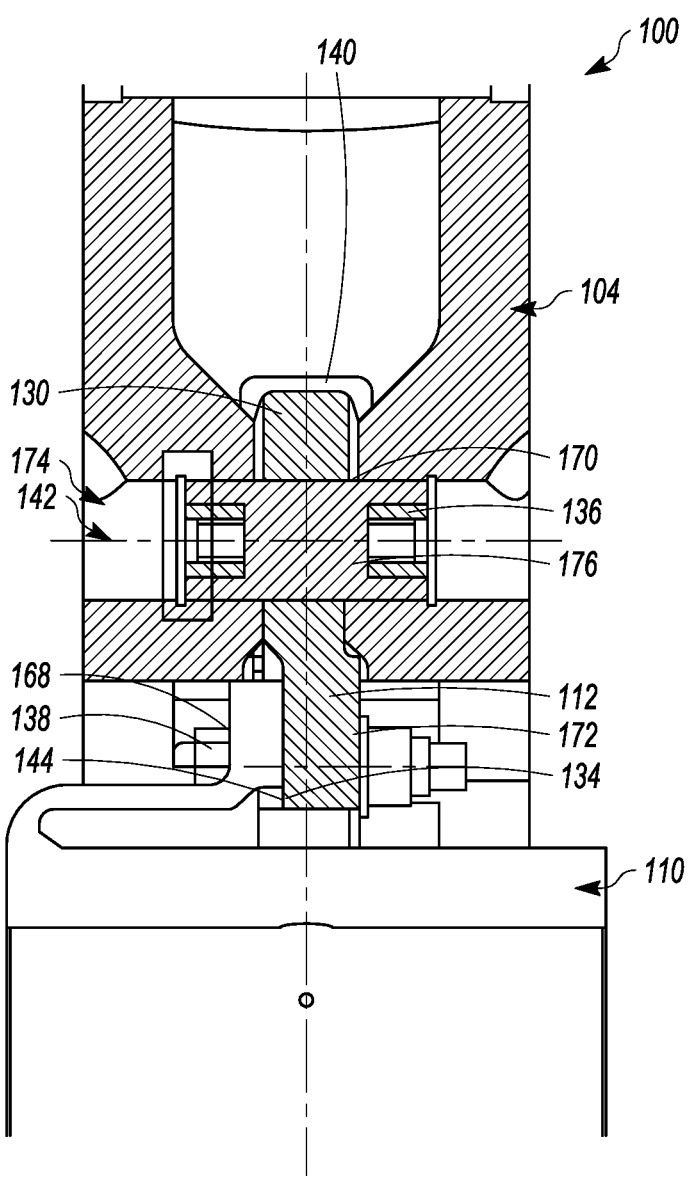
FIG. 6 illustrates a side cross-sectional view of the brake system shown in FIG. 1 in accordance with one embodiment.

FIG. 5 illustrates a perspective cross-sectional view of the brake system shown in FIG. 1 in accordance with one embodiment. FIG. 6 illustrates a side cross-sectional view of the brake system in accordance with one embodiment. The center axis 132 of the adapter is aligned with the center axis 108 of the wheel hub. The wheel hub includes a hub receiving pocket 144 that extends about the center axis of the hub. The adapter includes a hub coupling feature 134 that is positioned or disposed along the interior surface of the adapter and corresponds in shape and size with the hub receiving pocket. In one or more embodiments, the interior surface of the adapter may be referred to as a first surface of plural surfaces of the body of the adapter. In the illustrated embodiment, the hub coupling feature of the adapter is a notch or notched protrusion that extends away from the first surface (e.g., the interior surface) of the body of the adapter. The notch or notch protrusion is received within the hub receiving pocket of the wheel hub. For example, the hub coupling feature of the adapter mates or interferes with the coupling feature of the wheel hub to maintain a position of the adapter relative to a position of the wheel hub.

In one or more embodiments, the adapter may be coupled with the wheel hub by an additional or alternative coupling feature. For example, in the illustrated embodiment, the adapter and the wheel hub include passages through which plural first fasteners 138 may extend to couple the adapter to the wheel hub. The passages of the adapter are disposed about the perimeter of the adapter proximate to the interior surface of the adapter. The passages of the wheel hub are disposed about the perimeter of the wheel hub proximate an exterior surface 160 of the wheel hub. The passages of the adapter extend between the first side 120 and the second side 124 of the adapter, and the passages of the wheel hub extend between a first side 156 and a second side 158 of the wheel hub. The passages of the adapter are concentric with corresponding passages of the wheel hub such that the fastener (e.g., bolt, rivet, screw, or the like) may be disposed within or extend through the passage of the adapter and through the corresponding passage of the wheel hub. For example, the one or more fasteners maintain a position of the adapter relative to a position of the wheel hub.

Figure 8:
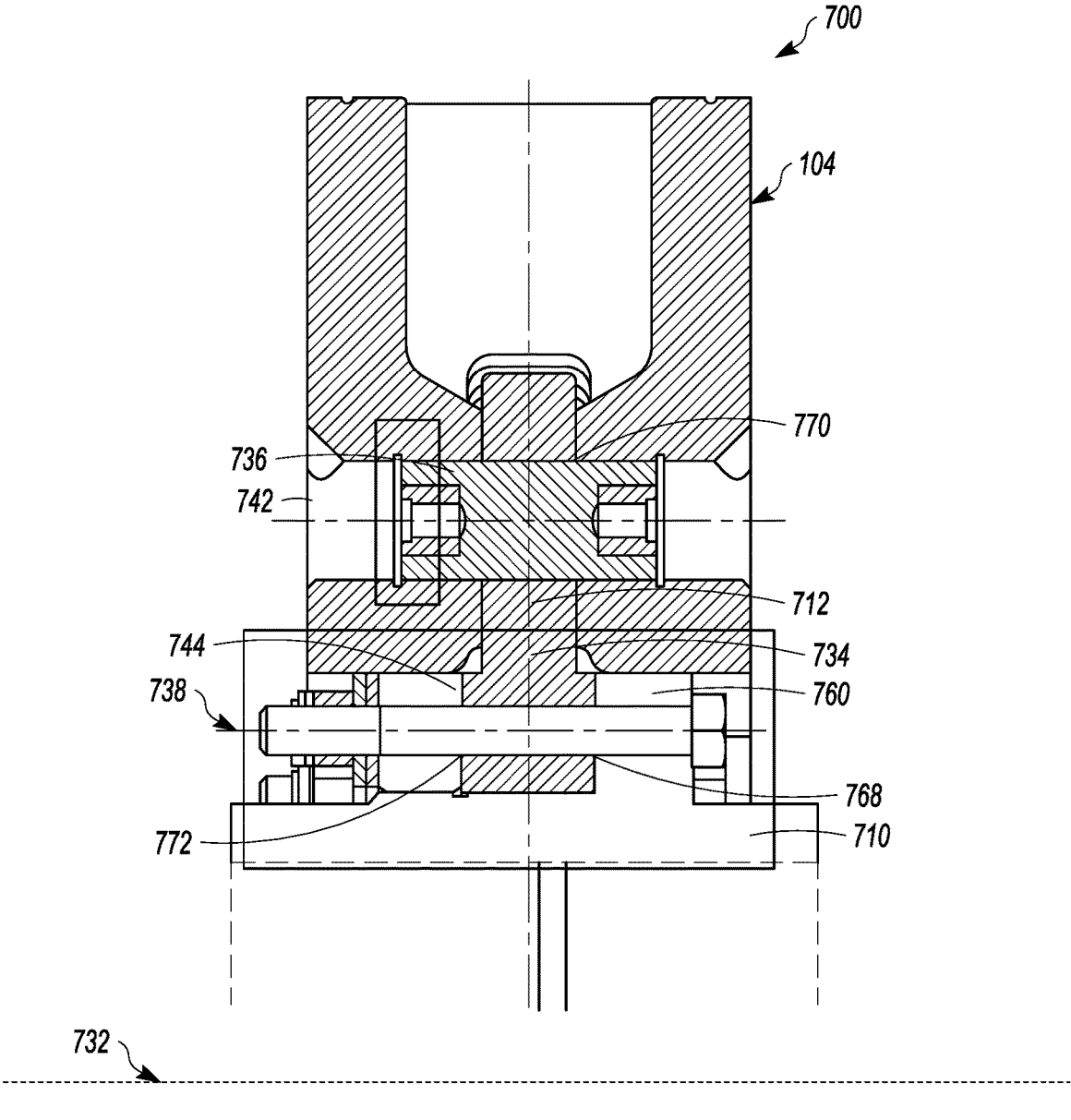
FIG. 8 illustrates a side cross-sectional view of a brake system in accordance with one embodiment.

Optionally, the wheel hub may have an alternative coupling feature based on the system design requirements of the wheel hub. For example, FIG. 8 illustrates a cross-sectional of a wheel hub 710 of a brake system 700 in accordance with one or more embodiments. The brake system includes the wheel hub that extends around an axle (not shown) of the system. The wheel hub includes a hub receiving pocket 744 disposed at an exterior surface or exterior end 760 of the wheel hub. In the illustrated embodiment, the receiving pocket is shaped and sized to receive a hub coupling feature 734 of an adapter 712 of the brake system. For example, the hub coupling feature of the adapter is positioned on a first surface or interior surface of the adapter that faces toward the wheel hub. The hub coupling feature is a protrusion or tab that extends into the receiving pocket of the wheel hub. For example, the hub coupling feature of the adapter couples the adapter to the wheel hub and maintains a position of the adapter relative to a position of the wheel hub.

In the illustrated embodiment, the adapter is coupled with the wheel hub by a second or secondary coupling feature. For example, the hub coupling feature of the adapter includes a first passage 772 that extends between a first side and a second side of the adapter along a center axis 732 of the adapter. Additionally, the wheel hub includes a second passage 768 that extend through portions of the wheel hub that form the receiving pocket of the wheel hub between a first side and a second side of the wheel hub along the center axis. For example, the first passage of the adapter is shaped, sized, and/or positioned such that the first passage of the adapter corresponds with the second passage of the wheel hub. The first passage of the adapter is coaxial with the second passage of the wheel hub. The brake system includes a first fastener 738 (e.g., bolt, screw, rivet, or the like) that extends through the first and second passages to couple the adapter with the wheel hub. For example, the first fastener maintains a position of the adapter relative to a position of the wheel hub.

The brake system shown in FIG. 8 also includes a brake disc assembly including a segment 104 of the brake disc assembly shown in FIG. 4. The brake disc assembly is coupled with the adapter. The brake disc assembly may be incompatible with the wheel hub such that the brake disc assembly may be prohibited from being directly coupled with the wheel hub. For example, the brake disc assembly may be incompatible with the second passages of the wheel hub. The adapter of the brake system may be disposed between the brake disc assembly and the wheel hub to indirectly couple the brake disc assembly with the wheel hub. The adapter includes a third passage 770 and the brake disc assembly includes a fourth passage 742. A second fastener 736 is positioned within the third and fourth passages of the adapter and the brake disc assembly to couple the brake disc assembly with the adapter. For example, the brake disc assembly is coupled with one portion of the adapter (e.g., an exterior portion of the adapter), and the wheel hub is coupled with another portion of the adapter (e.g., an interior portion of the adapter) to indirectly couple the wheel hub with the brake disc assembly.

Figure 9:
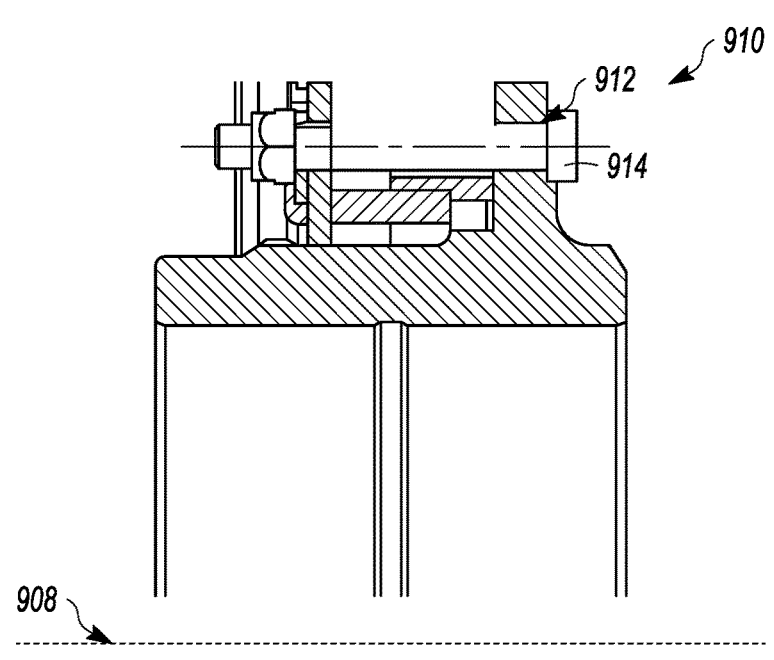
FIG. 9 illustrates a side cross-sectional view of a wheel hub in accordance with one embodiment.

FIG. 9 illustrates a partial cross-sectional view of another example of a wheel hub 910 in accordance with one or more embodiments. The wheel hub may be coupled with an axle (not shown) of a system, such as a vehicle system or other stationary system. The wheel hub may extend around a center axis 908 along which the axle extends. In one or more embodiments, a brake disc assembly may need to be coupled with the wheel hub, but the brake disc assembly that is to be coupled with the wheel hub may be incompatible with the wheel hub. For example, the brake disc assembly to be coupled with the wheel hub may be prohibited (e.g., shape, size, design, or the like) from being directly coupled with the wheel hub. An adapter (not shown) may be used to indirectly couple the wheel hub shown in FIG. 9 with a brake disc assembly. The wheel hub may include one or more coupling features that may correspond with one or more hub coupling features of an adapter to couple the adapter with the wheel hub. For example, the wheel hub may include a passage 912 that may receive a fastener 914 (e.g., a bolt, screw, rivet, or the like) that may be used to couple the wheel hub with an interior portion of the adapter. Additionally, a brake disc assembly may be coupled with an exterior portion of the adapter via one or more brake disc coupling features of the adapter to indirectly couple the brake disc assembly with the wheel hub.

Figure 10:
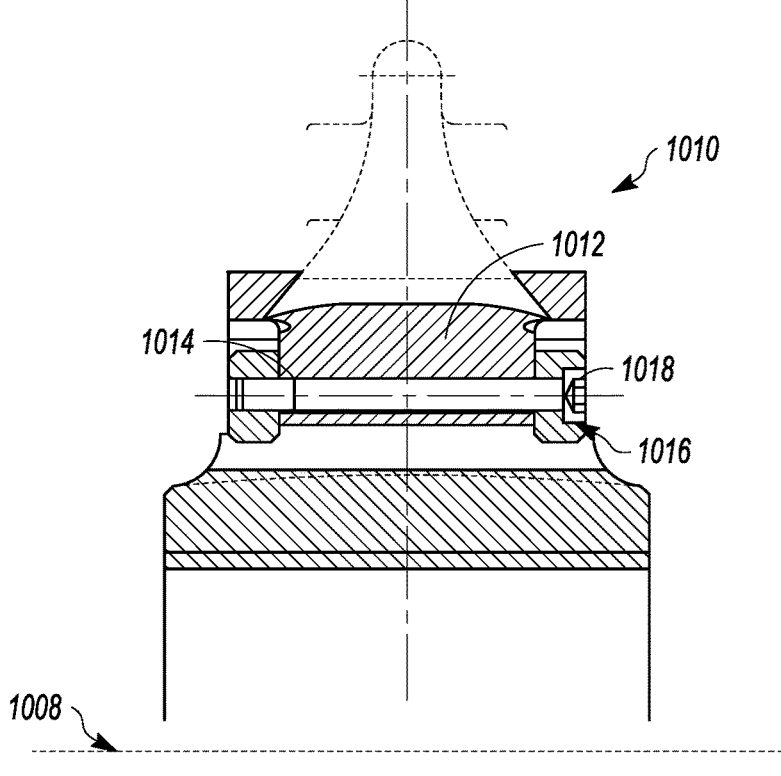
FIG. 10 illustrates a side cross-sectional view of a wheel hub in accordance with one embodiment.

FIG. 10 illustrates a partial cross-sectional view of another example of a wheel hub 1010 in accordance with one or more embodiments. The wheel hub extends about a center axis 1008, along which an axle of a system may extend. Like the wheel hub shown in FIG. 9, a brake disc assembly (not shown) may need to be coupled with the wheel hub, but the brake disc assembly may be incompatible with the wheel hub. For example, the brake disc assembly to be coupled with the wheel hub may be prohibited from being adequately, appropriately, safely, or the like, directly coupled with the wheel hub. An adapter 112 may be used to indirectly couple the brake disc assembly with the wheel hub. The adapter may include one or more hub coupling features that may be used to couple the adapter with the wheel hub. For example, the adapter may include a first passage 1014 that is sized, shaped, and aligned to correspond with a second passage 1016 of the wheel hub. A fastener 1018 (e.g., screw, rivet, or the like) may extend through the first and second passages of the adapter and the wheel hub to couple the adapter with the wheel hub. Additionally, the adapter may include one or more brake disc coupling features (not shown) that may be used to couple the adapter with the brake disc assembly (e.g., brake discs, segments of a segmented brake disc assembly, or the like). The brake disc coupling features may be and/or include fastener apertures, male and/or female mating features, alignment features, or the like. The adapter may be used to indirectly couple the brake disc assembly with the wheel hub when the brake disc assembly is incompatible with the wheel hub.

Figure 11:
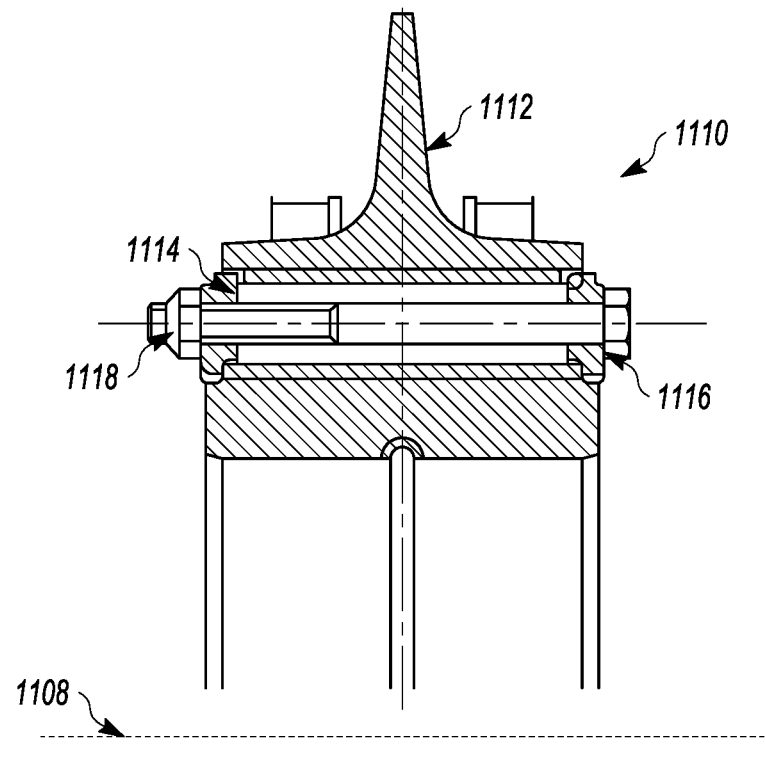
FIG. 11 illustrates a side cross-sectional view of a wheel hub in accordance with one embodiment.

FIG. 11 illustrates a partial cross-sectional view of another example of a wheel hub 1110 in accordance with one or more embodiments. The wheel hub extends about a center axis 1108 along which an axle (not shown) extends. A brake disc assembly may need to be coupled with the wheel hub, but the wheel hub and the brake disc assembly may be incompatible. For example, the brake disc assembly may be prohibited from being directly coupled with the wheel hub. An adapter 1112 may be coupled with the wheel hub via one or more hub coupling features. For example, the adapter may include a first passage 1114 and the wheel hub may include a second passage 1116 that may be shaped, sized, and aligned to correspond with the first passage. A fastener 1118 may extend through the first and second passages of the adapter and the wheel hub to couple the wheel hub with the adapter. Additionally, the adapter may be coupled with a brake disc assembly (not shown) via one or more brake disc coupling features (e.g., apertures, male/female coupling features, mating pockets, or the like), to indirectly couple the brake disc assembly with the wheel hub.

Figure 12:
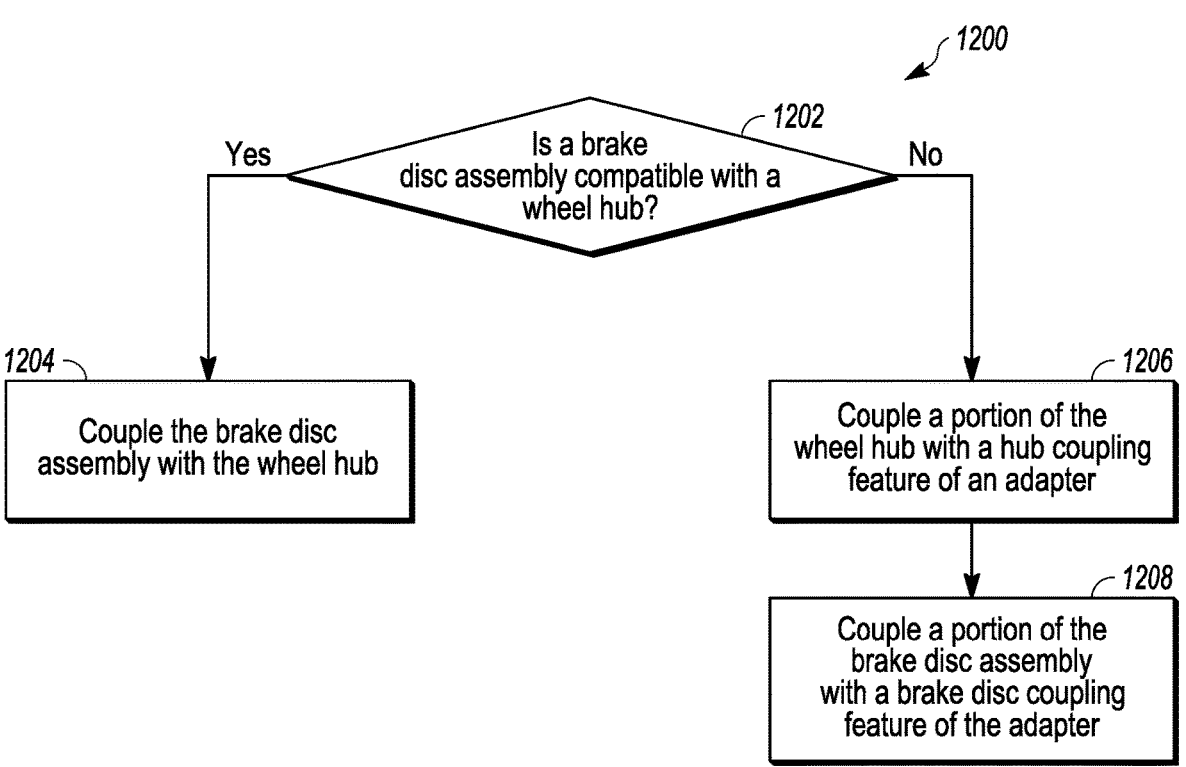
FIG. 12 illustrates a flowchart of a method of one example of coupling a brake disc assembly with an incompatible wheel hub in accordance with one embodiment.

FIG. 12 illustrates one example of a flowchart 1200 of coupling a brake disc assembly with an incompatible wheel hub in accordance with one embodiment. At step 1202, a determination is made whether a brake disc assembly is compatible with a wheel hub. For example, the wheel hub may require a new brake disc assembly, and a determination may be made whether the new brake disc assembly is compatible with the wheel hub. The brake disc assembly may be compatible with the wheel hub, for example, if a radius of curvature of the brake disc assembly corresponds with a radius of curvature of the wheel hub. Optionally, the brake disc assembly may be compatible with the wheel hub if the brake disc assembly includes coupling features (e.g., fastener apertures, coupling male/female features, other coupling components) that correspond with coupling features of the wheel hub. In one or more embodiments, the brake disc assembly may be compatible with the wheel hub if the brake disc assembly is capable or being adequately, appropriately, safely, or the like, coupled with the wheel hub.

If the brake disc assembly is compatible with the wheel hub, flow of the method proceeds toward step 1204, and the brake disc assembly is coupled with the wheel hub via the corresponding coupling features of the wheel hub and brake disc assembly. Alternatively, if the brake disc assembly is incompatible with the wheel hub, flow of the method proceeds toward step 1206.

At step 1206, a portion of the wheel hub is coupled with one or more hub coupling features of an adapter. The hub coupling feature of the adapter may be and/or include fastener apertures that correspond (e.g., in size, shape, alignment, positioning, number, or the like) with fastener apertures of the wheel hub. Optionally, the hub coupling features of the adapter may be and/or include other coupling features such as male or female coupling features, snapping features, or the like.

At step 1208, a portion of the brake disc assembly is coupled with one or more brake disc coupling features of the adapter. The brake disc coupling features of the adapter may be and/or include fastener apertures that correspond (e.g., in size, shape, alignment, positioning, number, or the like) with fastener apertures of the brake disc assembly. Optionally, the brake disc coupling features of the adapter may be and/or include other coupling features, such as male or female coupling features, snapping features, or the like. Coupling the portion of the wheel hub with the adapter, and coupling the portion of the brake disc assembly with the adapter indirectly couples the brake disc assembly with the wheel hub.

In one embodiment, the hub coupling features of the adapter may be disposed on an interior portion of the adapter, and the brake disc coupling features of the adapter may be disposed on an exterior portion of the adapter. The interion portion of the adapter may be disposed between the exterior portion and a center passage of the adapter in a radial direction away from the center passage.

Returning to FIG. 5, the adapter also includes one or more brake disc coupling features that correspond in shape, size, and/or orientation with one or more coupling features of the brake disc assembly. In the illustrated embodiment of FIG. 4, the adapter includes the plural protrusions 130 that extend away from the exterior surface of the adapter and away from the center axis of the adapter, and are disposed about the perimeter of the adapter. The protrusions may also be referred to as brake disc coupling features. For example, the protrusions extend within a first coupling pocket 140 of the corresponding brake disc segment of the segmented brake disc assembly. The brake disc coupling pocket may be shaped and sized to receive the protrusion of the adapter. In the illustrated embodiment of FIG. 5, the brake disc coupling feature of the adapter may be a first brake disc coupling feature, and may be coupled with or may be received within a first segment 104A of the segmented brake disc assembly. Additionally, a second brake disc coupling feature (e.g., another protrusion) may be coupled with or be received within a coupling pocket of a second segment 104B of the segmented brake disc assembly. In the illustrated embodiment, the adapter includes a male mating component that corresponds to a female mating component of the brake disc assembly to couple the adapter with the brake disc assembly. Optionally, the adapter and/or the brake disc assembly may include an alternative coupling features.

In one or more embodiments, the adapter may include additional or alternative coupling features that may be used to couple the adapter with the brake disc assembly. For example, the adapter shown in FIGS. 4 and 5 includes plural second brake disc coupling features 136. In one or more embodiments, the second brake disc coupling features may be and/or include the second fasteners (shown in FIG. 3) that couple the adapter with the brake disc assembly. The second brake disc coupling features are disposed proximate to the protrusions of the adapter, and extend away from the first and second sides of the adapter, respectively. For example, the protrusions (e.g., the first brake disc coupling features) extend in a first direction away from the center axis of the passage of the adapter, and the second brake disc coupling features extend in a second direction that is substantially perpendicular to the first direction of the protrusions and is substantially parallel with the center axis. In one or more embodiments, the second brake disc coupling features may be unitarily formed as a unitary structure with the protrusions of the adapter. Optionally, the second brake disc coupling features may be separate components that may be coupled with the adapter (e.g., via fastening methods, interference fits, or the like).

The second brake disc coupling features are disposed within corresponding second coupling pockets 142 of the segments of the segmented brake disc assembly. In the illustrated embodiment, the second coupling pocket of the segment 104A is an open passage that extends between the first side 146 and the second side 148 of the segment 104A. Optionally, the second coupling pocket may be open to the first side of the segment but may not extend to the second side of the segment. Optionally, the second coupling pocket may extend any length between the first and second sides of the segment.

The brake disc assembly may be uncoupled from the adapter to be repaired, replaced, or the like. For example, the brake disc assembly may be removed or separated from the adapter while the adapter remains coupled with the wheel hub. In one or more embodiments, the brake disc assembly may have a lifespan that is shorter or less than a lifespan of the wheel hub and/or the adapter. The brake disc assembly may be repaired and/or replaced by decoupling the brake disc assembly from the adapter without decoupling the adapter from the wheel hub. The repaired brake disc assembly, or a new brake disc assembly may subsequently be coupled with the adapter and indirectly coupled with the wheel hub. Optionally, the new brake disc assembly may be different than the original brake disc assembly, and a new adapter may be coupled with the wheel hub to indirectly couple the wheel hub with the new brake disc assembly. Optionally, one or more segments of the segmented brake disc assembly may be removed or uncoupled from the adapter to repair and/or replace the one or more segments while the other segments remain coupled with the adapter.

In one or more embodiments, the interfaces between the brake disc coupling features of the adapter and the brake coupling features of the brake disc assembly may be shaped and sized to control an amount of expansion of the brake disc assembly that is translated to the wheel hub. For example, the adapter is designed to allow expansion of the brake disc assembly and to control an amount of the expansion that is directed to or received by the wheel hub. The adapter may maintain a level of stability of the wheel hub as the wheel hub rotates with the axle regardless of an imbalance caused by expansion of the brake disc assembly.

Figure 7:
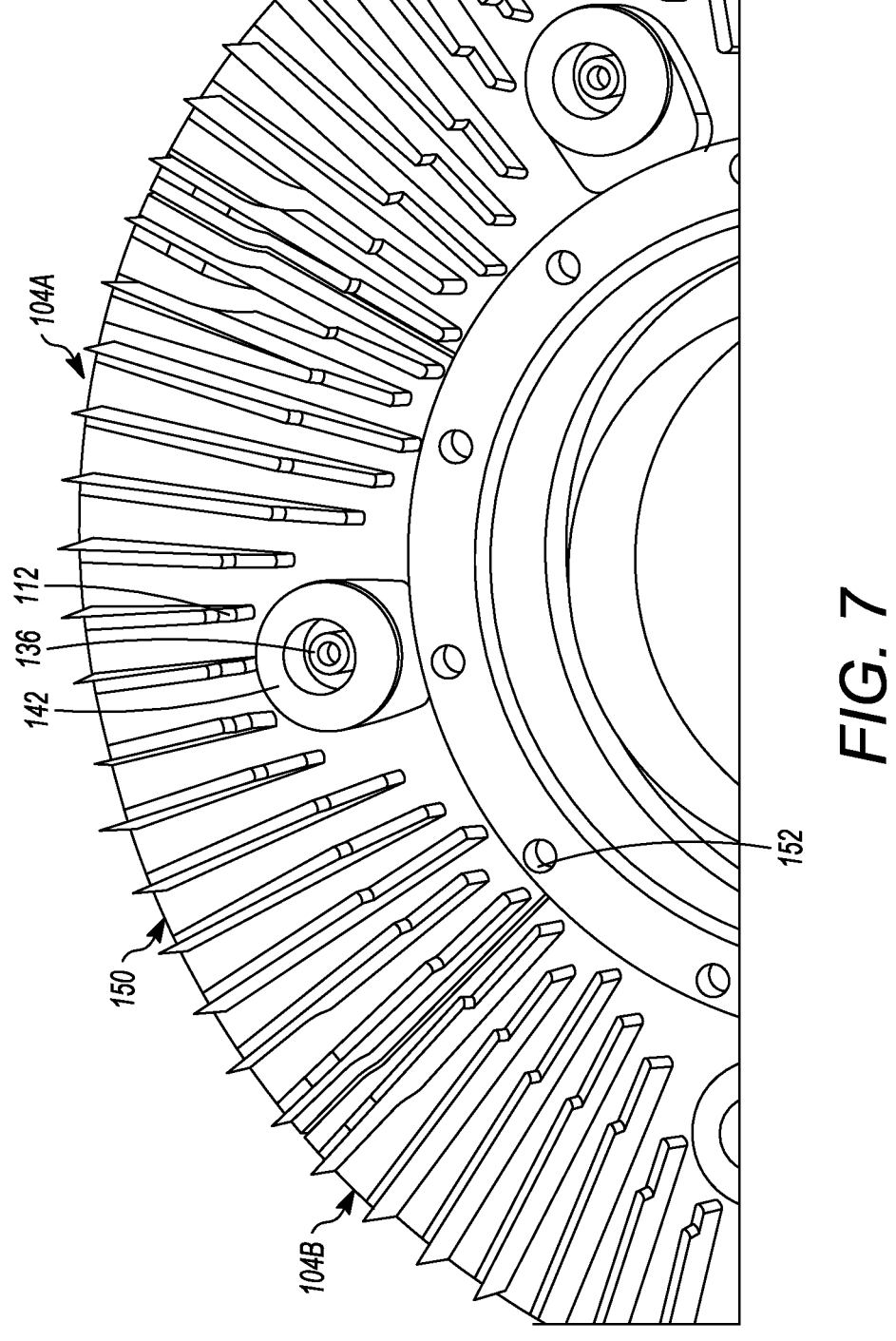
FIG. 7 illustrates a partial cross-sectional view of a brake system in accordance with one embodiment.

In one or more embodiments, the brake disc assembly may include one or more cooling passages or cooling methods that may control an amount of expansion of the brake disc assembly during operation of the brake system. For example, FIG. 7 illustrates a partial cross-sectional view of the brake system. In the illustrated embodiment of FIG. 7, the first and second sides of the segments of the segmented brake discs are removed. The segments include the plural fins 150 that extend radially away from the center axis of the adapter. The fins may be shaped to control an amount of energy (e.g., thermal energy) within the brake disc assembly. The brake disc assembly also includes plural cooling passages 152. The cooling passages may be shaped and positioned to control flow characteristics (e.g., pressure, direction, volume, flow rate, or the like) of a cooling fluid that may move within the brake system. In one or more embodiments, the body of the adapter may be shaped to control one or more flow characteristics of the cooling fluid that moves within the brake system.

In one or more embodiments of the subject matter described herein, an adapter includes a body having plural surfaces configured to extend around at least a portion of an axle of a vehicle system. The body may include an interior portion and an exterior portion. The interior portion is positioned between a center passage of the body and the exterior portion in a radial direction away from the center passage. A hub coupling feature is positioned on the interior portion of the body. The hub coupling feature may be coupled with a portion of a wheel hub of the vehicle system. The wheel hub is operably coupled with the axle of the vehicle system. A brake disc coupling feature is positioned on the exterior portion of the body. The brake disc coupling feature may be coupled with a portion of a brake disc assembly. The brake disc assembly is configured to control a rotational speed of the axle. The wheel hub and the brake disc assembly are incompatible such that the wheel hub is prohibited from being directly coupled with the brake disc assembly.

Optionally, the brake disc assembly may be a segmented brake disc assembly comprising plural segments disposed around a perimeter of the axle. The brake disc coupling feature may be coupled with a portion of at least one segment of the plural segments of the segmented brake disc assembly.

Optionally, the brake disc coupling feature may be a first brake disc coupling feature. The adapter may include plural brake disc coupling features. The first segment of the plural segments of the segmented brake disc assembly may be coupled with first brake disc coupling feature of the plural brake disc coupling features, and a second segment of the plural segments of the segmented brake disc assembly may be coupled with second brake disc coupling feature of the plural brake disc coupling features.

Optionally, the brake disc assembly may include a first brake disc disposed on a first side of the body and a second brake disc disposed on a second side of the body. The brake disc coupling feature may couple the first brake disc and the second brake disc with the body and couple the first brake disc with the second brake disc.

Optionally, the brake disc assembly may be uncoupled from the brake disc coupling feature to one or more of repair or replace the brake disc assembly.

Optionally, a fluid may be directed through one or more of the wheel hub or the brake disc assembly. The body may be shaped to control one or more flow characteristics of the fluid as the fluid moves within the one or more of the wheel hub or the brake disc assembly.

Optionally, the center passage of the body may be concentric with a center axis of the axle.

Optionally, the hub coupling feature may include a first passage and the wheel hub may include a second passage that is aligned with the first passage. The first and second passage may receive a first fastener to couple the wheel hub with the body of the adapter. The brake disc coupling feature may include a third passage and the brake disc assembly may include a fourth passage that is aligned with the third passage. The third and fourth passages may receive a second fastener to couple the brake disc assembly with the body of the adapter.

In one or more embodiments of the subject matter described herein, a method includes coupling a portion of a wheel hub of a vehicle system with a hub coupling feature of an adapter. The adapter includes a body having plural surfaces configured to extend around at least a portion of an axle of the vehicle system. The body may include an interior portion and an exterior portion. The interior portion is positioned between a center passage of the body and the exterior portion in a radial direction away from the center passage. The hub coupling feature is positioned on the interior portion of the body. The wheel hub is operably coupled with the axle. A portion of a brake disc assembly may be coupled with a brake disc coupling feature of the adapter. The brake disc coupling feature is positioned on the exterior portion of the body. The wheel hub and the brake disc assembly are incompatible such that the wheel hub is prohibited from being directly coupled with the brake disc assembly.

Optionally, the wheel hub, the adapter, and the brake disc assembly may be rotated via rotation of the axle.

Optionally, the brake disc assembly may be uncoupled from the brake disc coupling feature to one or more of repair or replace the brake disc assembly.

Optionally, the brake disc assembly may be a segmented brake disc assembly including plural segments disposed around a perimeter of the axle. The brake disc coupling feature may be received with a portion of at least one segment of the plural segments of the segmented brake disc assembly.

Optionally, the brake disc coupling feature may be a first brake disc coupling feature. The adapter may include plural brake disc coupling features. The first segment of the plural segments of the segmented brake disc assembly may be coupled with the first brake disc coupling feature of the plural brake disc coupling features, and a second segment of the plural segments of the segmented brake disc assembly may be coupled with a second brake disc coupling feature of the plural brake disc coupling features.

Optionally, a fluid may be directed through one or more of the wheel hub or the brake disc assembly. The body may be shaped to control one or more flow characteristics of the fluid as the fluid moves through the one or more of the wheel hub or the brake disc assembly.

Optionally, the center passage of the body may be concentric with a center axis of the axle.

In one or more embodiments of the subject matter described herein, a brake system includes a wheel hub operably coupled with an axle of a vehicle system, a brake disc assembly configured to control a rotational speed of the axle, and an adapter. The adapter has a body extending around at least a portion of the axle. The body includes an interior portion and an exterior portion. The interior portion of the body is positioned between a center passage of the body and the exterior portion in a radial direction away from the center passage. The body may include a hub coupling feature positioned on the interior portion of the body. The hub coupling feature may be coupled with a portion of the wheel hub of the vehicle system. The body also includes a brake disc coupling feature positioned on the exterior portion of the body. The brake disc coupling feature may be coupled with a portion of the brake disc assembly. The wheel hub and the brake disc assembly are incompatible such that the wheel hub is prohibited from being directly coupled with the brake disc assembly.

Optionally, the brake disc assembly may be a segmented brake disc assembly comprising plural segments disposed around a perimeter of the axle. A portion of at least one segment of the plural segments of the segmented brake disc assembly may receive the brake disc coupling feature.

Optionally, the brake disc coupling feature may be a first brake disc coupling feature. The adapter may include plural brake disc coupling features. The first segment of the plural segments may be coupled with the first brake disc coupling feature of the plural brake disc coupling features, and a second segment of the plural segments may be coupled with a segment brake disc coupling feature of the plural brake disc coupling features.

Optionally, the brake disc assembly may include a first brake disc disposed on a first side of the body and a second brake disc disposed on a second side of the body. The brake disc coupling feature may couple the first brake disc and the second brake disc with the body and couple the first brake disc with the second brake disc.

Optionally, the brake disc assembly may be uncoupled from the brake disc coupling feature of the adapter to one or more of repair or replace the brake disc assembly.

Optionally, a fluid may be directed through one or more of the wheel hub or the brake disc assembly. The body may be shaped to control one or more flow characteristics of the fluid as the fluid moves through the one or more of the wheel hub or the brake disc assembly.

Optionally, the center passage of the body may be concentric with a center axis of the axle.

Optionally, the hub coupling feature may include a first passage and the wheel hub may include a second passage that is aligned with the first passage. The first and second passages may receive a first fastener to couple the wheel hub with the body of the adapter. The brake disc coupling feature may include a third passage and the brake disc assembly may include a fourth passage that is aligned with the third passage. The third and fourth passages may receive a second fastener to couple the brake disc assembly with the body of the adapter.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An adapter comprising:
a body having plural surfaces configured to extend around at least a portion of an axle of a vehicle system, the body comprising an interior portion and an exterior portion, wherein the interior portion is positioned between a center passage of the body and the exterior portion in a radial direction away from the center passage;
a hub coupling feature positioned on the interior portion of the body, the hub coupling feature configured to be coupled with a portion of a wheel hub of the vehicle system, the wheel hub operably coupled with the axle of the vehicle system; and
a brake disc coupling feature positioned on the exterior portion of the body radially outward from the hub coupling feature, the brake disc coupling feature including an exterior protrusion extending away from an exterior surface of the body in a direction away from the center passage of the body such that the exterior protrusion forms at least a portion of the radially outermost surface of the body, the brake disc coupling feature configured to be coupled with a segment of plural segments of a brake disc assembly, the brake disc assembly comprising plural segments disposed around a perimeter of the body, wherein the exterior protrusion comprises a first side and a second side facing away from the first side along a center axis of the axle, wherein the exterior protrusion is configured to extend into a pocket defined radially inward along a centerline of the brake disc assembly such that the first side and the second side of the exterior protrusion are bounded by the segment of the brake disc assembly and accommodate expansion of the segment of plural segments to stabilize the wheel hub regardless of an imbalance caused by expansion of the segment of plural segments, the brake disc assembly configured to control a rotational speed of the axle,
wherein the hub coupling feature and the brake disc coupling feature allow the brake disc assembly to be operably coupled with the wheel hub.

2. The adapter of claim 1, wherein the brake disc coupling feature is a first brake disc coupling feature and the segment of plural segments is a first segment, the adapter further comprising plural brake disc coupling features, wherein the first brake disc coupling feature is configured to be coupled with the first segment of the plural segments of the brake disc assembly, and
wherein a second brake disc coupling feature is configured to be coupled with a second segment of the plural segments of the brake disc assembly.

3. The adapter of claim 1, wherein the brake disc coupling feature is configured to couple a first brake disc of the brake disc assembly that is disposed on a first side of the body with a second brake of the brake disc assembly that is disposed on a second side of the body.

4. The adapter of claim 1, wherein the brake disc coupling feature is configured to be uncoupled from the brake disc assembly to one or more of repair or replace the brake disc assembly.

5. The adapter of claim 1, wherein the body is shaped to control one or more flow characteristics of a fluid configured to move through one or more of the wheel hub or the brake disc assembly.

6. The adapter of claim 1, wherein the center passage of the body is concentric with the center axis of the axle.

7. The adapter of claim 1, wherein the hub coupling feature includes a third passage that is configured to be aligned with a fourth passage of the wheel hub, the third and fourth passages configured to receive a first fastener to couple body of the adapter with the wheel hub, and wherein a first passage of the brake disc coupling feature and a second passage of the brake disc assembly are configured to receive a second fastener to couple the body of the adapter with the brake disc assembly.

8. A method comprising:
coupling a portion of a wheel hub of a vehicle system with a hub coupling feature of an adapter, the adapter including a body having plural surfaces configured to extend around at least a portion of an axle of the vehicle system, the body comprising an interior portion and an exterior portion, the interior portion is positioned between a center passage of the body and the exterior portion in a radial direction away from the center passage, the hub coupling feature positioned on the interior portion of the body, the wheel hub operably coupled with the axle; and
coupling a brake disc coupling feature of the adapter with a segment of plural segments of a brake disc assembly, the brake disc assembly comprising plural segments disposed around a perimeter of the body, the brake disc coupling feature positioned on the exterior portion of the body radially outward from the hub coupling feature, the brake disc coupling feature including an exterior protrusion extending away from an exterior surface of the body in a direction away from the center passage of the body such that the exterior protrusion forms at least a portion of the radially outermost surface of the body, wherein the exterior protrusion comprises a first side and a second side facing away from the first side along a center axis of the axle, wherein coupling the brake disc coupling feature of the adapter with the portion of a brake disc assembly comprises positioning the exterior protrusion within a pocket defined radially inward along a centerline of the brake disc assembly such that the first side and the second side of the exterior protrusion are bounded by the segment of the brake disc assembly and accommodate expansion of the segment of plural segments to stabilize the wheel hub regardless of an imbalance caused by expansion of the segment of plural segments.

9. The method of claim 8, further comprising rotating the wheel hub, the adapter, and the brake disc assembly via rotation of the axle.

10. The method of claim 8, further comprising uncoupling the segment of the brake disc assembly from the brake disc coupling feature to one or more of repair or replace the segment of the brake disc assembly.

11. The method of claim 8, wherein the brake disc assembly is a segmented brake disc assembly, wherein the brake disc coupling feature is a first brake disc coupling feature and the segment of the brake disc assembly is a first segment, the adapter further comprising plural brake disc coupling features, and further comprising:

coupling the first brake disc coupling feature with the first segment of the plural segments of the segmented brake disc assembly; and coupling a second brake disc coupling feature with a second segment of the plural segments of the segmented brake disc assembly.

12. The method of claim 8, further comprising directing a fluid through one or more of the wheel hub or the brake disc assembly, wherein the body is shaped to control one or more flow characteristics of the fluid as the fluid moves through the one or more of the wheel hub or the brake disc assembly.

13. The method of claim 8, wherein the center passage of the body is concentric with the center axis of the axle.

14. A brake system comprising:

a wheel hub operably coupled with an axle of a vehicle system;

a segmented brake disc assembly configured to control a rotational speed of the axle, the segmented brake disc assembly comprising a segment, wherein a pocket is defined in the segment defined radially inward along a centerline of the segment; and an adapter having a body extending around at least a portion of the axle, the body including an interior portion and an exterior portion, the interior portion being positioned between a center passage of the body and the exterior portion in a radial direction away from the center passage, the body comprising a hub coupling feature positioned on the interior portion of the body, the hub coupling feature configured to be coupled with a portion of the wheel hub of the vehicle system, the body comprising a brake disc coupling feature positioned on the exterior portion of the body radially outward from the hub coupling feature, the brake disc coupling feature including an exterior protrusion extending away from the body of the adapter in a direction away from the center passage such that the body has a varying diameter about a perimeter of the body and the exterior protrusion forms at least a portion of the radially outermost surface of the body, wherein the exterior protrusion comprises a first side and a second side facing away from the first side along a center axis of the axle, the exterior protrusion configured to extend into the pocket of the segment of the segmented brake disc assembly such that the first side and the second side of the exterior protrusion are bounded by the segmented brake disc assembly and accommodate expansion of the segment to stabilize the wheel hub regardless of an imbalance caused by expansion of the segment.

15. The brake system of claim 14, wherein the segmented brake disc assembly comprises plural segments disposed around a perimeter of the axle.

16. The brake system of claim 15, wherein the brake disc coupling feature is a first brake disc coupling feature, the adapter further comprising plural brake disc coupling features.

17. The brake system of claim 14, wherein the segment of the segmented brake disc assembly is configured to be uncoupled from the brake disc coupling feature of the adapter to one or more of repair or replace the segment of the segmented brake disc assembly.

18. The brake system of claim 14, wherein the hub coupling feature includes a first passage and the wheel hub includes a second passage that is aligned with the first passage, the first and second passages configured to receive a first fastener to couple the wheel hub with the body of the adapter, and wherein the brake disc coupling feature includes a third passage and the segmented brake disc assembly includes a fourth passage that is aligned with the third passage, the third and fourth passages configured to receive a second fastener to couple the segmented brake disc assembly with the body of the adapter.

* * * * *